Patented May 10, 1932

1,858,042

UNITED STATES PATENT OFFICE

ALFRED R. L. DOHME, OF BALTIMORE, MARYLAND, ASSIGNOR TO SHARP & DOHME, INC., OF BALTIMORE, MARYLAND, A CORPORATION OF NEW JERSEY

HIGHER ALKYL RESORCINOLS

No Drawing. Application filed October 12, 1927. Serial No. 225,833.

This invention relates to new higher alkyl resorcinols having the general formula $C_6H_3(OH)_2R$ where R is an alkyl group containing at least eight carbon atoms.

This application is a continuation in part of my prior application Ser. No. 26,813, filed April 29, 1925, and includes the higher alkyl resorcinols such as octyl, nonyl, decyl, undecyl, dodecyl, tridecyl-resorcinols, etc.

The new alkyl resorcinols may be prepared by reducing the corresponding acyl resorcinols with a reducing agent such, for example, as zinc amalgam and hydrochloric acid, followed by purification by distillation in vacuo, recrystallization from solvents, etc.

The following example illustrates the method of producing the new higher alkyl resorcinols, but it will be understood that the invention is not limited to the alkyl resorcinols prepared in this particular way. The parts are by weight:

To a solution of 125 parts of anhydrous zinc chloride in 300 parts of pelargonic (nonoic) acid, produced by vigorous stirring and heating, is slowly added about 95 parts of resorcinol while the temperature is maintained at about 125–135° C. After the addition of the resorcinol the reaction mixture is stirred for about two hours while the temperature above mentioned is maintained. At the end of this time cold water is added and the solution stirred. An oily layer separates which is washed three or more times with cold water and the washed oil is finally distilled in a vacuum to remove the water and excess acid and finally the ketone which solidifies on cooling.

152 parts of the distilled ketone are reduced by 400 parts of zinc amalgam (amalgamated with a small mount of mercury) in 1200 parts of 1 to 1 hydrochloric acid. With heating of the reaction mixture to a temperature around 105° C. and with vigorous stirring, reduction may be completed in around six to eight hours. Reduction may be considered to be complete when a few drops of the oily product dissolved in a few cubic centimeters of alcohol show no coloration on addition of a drop of ferric chloride solution. The reduced product is washed three or more times with water and distilled in vacuum.

The following table gives the melting point and the boiling point, respectively, obtained for the higher alkyl resorcinols containing 8 to 14 carbon atoms, respectively, in the alkyl groups.

| | Melting point | Boiling point |
|---|---|---|
| Octyl resorcinol (from octoic acid) | 73–73.5 | 199–201° at 7 mm. |
| Nonyl resorcinol (from pelargonic acid) | 66–67 | 220–225° at 10 mm. |
| Decyl resorcinol (from capric acid) | 73–74 | 235–240° at 11 mm. |
| Undecyl resorcinol (from undecylic acid) | | 230–235° at 10 mm. |
| Dodecyl resorcinol (from lauric acid) | 84–85 | 224–226° at 7 mm. |
| Tridecyl resorcinol (from tridecylic acid) | | 250–255° at 12 mm. |
| Tetradecyl resorcinol (from myristic acid) | 65–67 | |

In a similar manner other higher alkyl resorcinols can be produced. It is not necessary to produce the new products in the purest form, but products of high purity can be readily produced and on further purification products of somewhat higher melting points can be produced.

The higher alkyl resorcinols of the present invention are insoluble in water and have no measurable phenol coefficient. When, however, dissolved in suitable solvents, for example in water containing caustic alkali, they form powerful antiseptics.

I claim:

1. New and useful germicidal and antiseptic products comprising alkyl resorcinols having not less than eight carbon atoms in the alkyl group.

2. As a new product octyl resorcinol having the formula $C_6H_3(OH)_2C_8H_{17}$.

3. As new products, alkyl resorcinols having not less than eight nor more than fourteen carbon atoms in the alkyl group.

4. As new products, alkyl resorcinols having not less than eight nor more than ten carbon atoms in the alkyl group.

5. As new products, alkyl resorcinols having not less than eight nor more than twelve carbon atoms in the alkyl group.

6. New and useful germicidal and antiseptic products comprising alkyl resorcinols containing more than seven carbon atoms in the alkyl group, and a vehicle therefor.

In testimony whereof I affix my signature.

ALFRED R. L. DOHME.